July 23, 1963
L. E. FROSLIE
3,098,507
HYDRODYNAMIC TRANSMISSION CONTROL
Original Filed Feb. 18, 1957
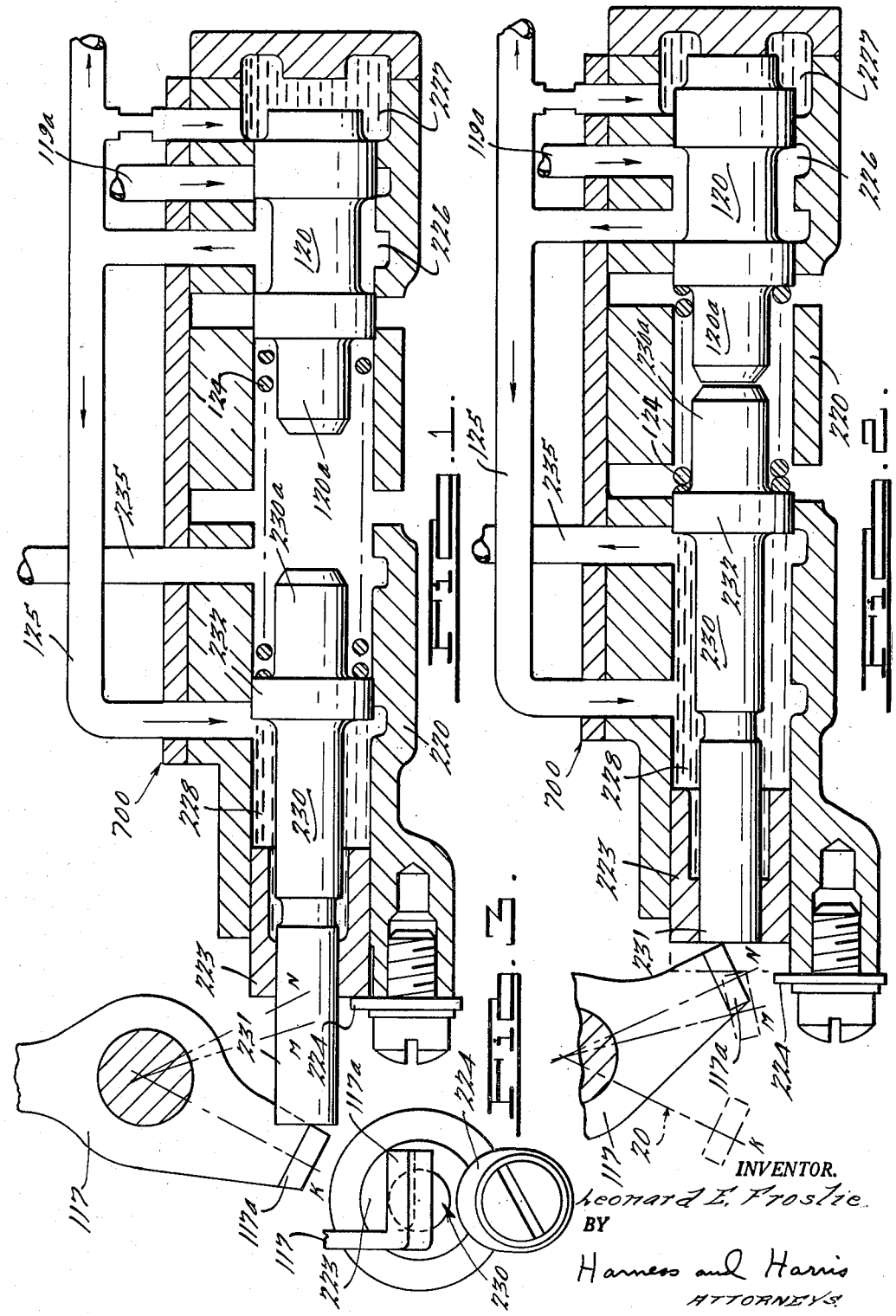
INVENTOR.
Leonard E. Froslie
BY
Harness and Harris
ATTORNEYS 3,098,507
HYDRODYNAMIC TRANSMISSION CONTROL
Leonard E. Froslie, Detroit, Mich., assignor to Chrysler Corporation, Highland Park, Mich., a corporation of Delaware
Original application Feb. 18, 1957, Ser. No. 640,804, now Patent No. 3,000,230, dated Sept. 19, 1961. Divided and this application Mar. 27, 1961, Ser. No. 98,486
3 Claims. (Cl. 137—628)

This invention relates to a power transmission unit primarily intended for motor vehicle use and is particularly concerned with the controls for a multi-speed transmission of this type that will function to automatically provide three (3) forward drive speeds and/or two (2) forward speeds with novel means for controlling the changes in speed ratio in both upshifting and downshifting sequence. This application is a division of my parent application Serial No. 640,804, filed February 18, 1957, now U. S. Patent 3,000,230.

It is a primary object of this invention to provide an improved type of control for effecting a manually or driver-operated change in speed ratio drive through the transmission.

It is another object of this invention to provide an improved type of throttle pressure control valve for a hydraulically operated engine driven power transmission unit.

It is still another object of this invention to provide a novel type of combination throttle pressure control and transmission kickdown valve that are a unitary interrelated structure.

It is a still further object of this invention to provide a combination throttle pressure and kickdown control valve having pressure fluid detent means to signal the initiation of the kickdown operation.

It is still another object of this invention to provide a single bore, multiple valve, kickdown and throttle pressure control valve unit with interconnected fluid pressure chambers that cooperate to provide hydraulic detent means and snap action kickdown drive ratio changes.

Other objects and advantages of this invention will become readily apparent from a consideration of the subsequent description and the related drawings wherein:

FIG. 1 is an enlarged sectional elevational view of the throttle and kickdown valve unit with the throttle valve only partially open and the kickdown valve in its normal inactive position;

FIG. 2 is a view similar to FIG. 1 but showing the throttle valve substantially wide open and the kickdown valve moved to its kickdown position; and FIG. 3 is an end elevation of the valve shown in FIG. 2, the view being taken looking in the direction of the arrow 20 of FIG. 2 to show the kickdown valve operator.

FIGS. 1–3 show the valve unit 700 that includes kickdown valve 230 and throttle pressure control valve 120. This unit 700 comprises a casing 220 having a bore extending longitudinally thereof that receives the axially shiftable throttle valve 120 and kickdown valve 230. Valves 120 and 230 are interconnected by a compression spring 124 so that rightward movement of the kickdown valve 230 will initially cause a rightward shift of the throttle valve 120. Extending concentrically about a portion of the stem 231 of kickdown valve 230 is a sleeve piston 223. A stop 224 retains the sleeve piston 223 within the bore in the left end of casing 220. The pivotally mounted lever plate 117, that is rotated by depression of the accelerator pedal 115, has a bent end finger portion 117a (see FIG. 3) that is arranged to sequentially engage the stem 231 of the kickdown valve 230 and thereafter the sleeve piston 223 if the accelerator should be depressed sufficiently to cause a kickdown. It is preferred that the kickdown be accomplished during but not until the last five or ten degrees of throttle valve opening movement. Such an arrangement has the least detrimental effect on engine torque usable for direct drive.

Operation of the combination kickdown and throttle pressure control valve is thought to be more or less obvious from a consideration of FIGS. 1–3. As the accelerator pedal is depressed, the lever plate 117 will be rotated counterclockwise and the finger portion 117a of plate 117 will engage valve stem 231 and urge the kickdown valve 230 towards the right. Movement of the kickdown valve 230 towards the right will be transmitted to the throttle pressure control valve 120 by means of the compression spring 124. As throttle valve 120 moves rightward from its position in FIG. 1 "line" pressure in conduit 119a will be bled into the chamber 226 and transferred to the conduit 125 and its several branch conduits. The pressure fluid in chamber 226 is normally less than the "line" pressure because of the pressure regulating action of the throttle valve 120. It will be noted that "throttle" pressure directed into conduit 125 is applied to the reaction area 227 at the right end of throttle valve 120 and this same "throttle" pressure is also directed into the chamber 228 at the left end of valve body 220 between the sleeve piston 223 and the land portion 232 of kickdown valve 230. During normal movement of the accelerator operated throttle control 117a between its closed throttle position K (see FIGS. 1 and 2) and its substantially wide open position M the finger portion 117a of the lever plate 117 engages only the stem portion 231 of the kickdown valve 230. During this throttle opening movement through the arc K, M the force opposing movement of the kickdown valve 230 is relatively light because it represents merely the "throttle" pressure applied to a relatively small portion of the right end of throttle valve 120. It will be noted that the "throttle" pressure in the chamber portion 228 opposes the "throttle" pressure applied to the right end of throttle valve 120 and thus the force urging the kickdown valve 230 leftwardly is the force resulting from the "throttle" pressure against the differential areas of chamber 228 and the area of the right end of throttle valve 120. However, when the finger 117a of lever plate 117 reaches point M of its throttle valve opening arc of movement, the sleeve piston 223 is then picked up and moved rightwardly at the same time that the kickdown valve 230 is being moved rightwardly. At the moment that sleeve piston 223 is picked up for movement by the finger 117a of lever plate 117 the force urging the kickdown valve 230 leftwardly is materially increased for now the lever plate finger 117a must overcome the leftwardly directed force of the "throttle" pressure against the full area of the right end of throttle valve 120. Furthermore, at the time that lever finger 117a initiates rightward movement of sleeve piston 223, the throttle valve 120 has been moved rightward to such a degree that "line" pressure from conduit 119a now flows directly into chamber 226 and thus the "throttle" pressure is substantially equal to the line pressure (90 p.s.i.) and thus the force on the right end of throttle valve 120 caused by the "throttle" pressure in chamber 227, is at its maximum. This same maximum "throttle" pressure is being directed into the chamber 228 at the left end of the casing 220 and at this time the land 232 of kickdown valve 230 has been moved rightwardly to such a degree that the chamber 228 is now connected to the conduit 235 (see FIG. 2) so that "throttle" pressure (substantially 90 p.s.i.) will be directed to the kickdown areas at the right ends of each of the shift valve units 140 and 240. Another force that opposes the movement of the kickdown valve 230 rightwardly to kickdown position is that force resulting from the compression of the spring 124 as the kickdown valve end 230a is moved towards engagement with the throttle valve end 120a. It is thought that the foregoing description of FIGS. 1 through 3 clearly explains the invention relating to the novel structure for throttle control and kickdown operation in the disclosed transmission control system. Furthermore, the specific arrangement shown in FIGS. 1 through 3 materially simplifies the kickdown and "throttle" pressure controls and eliminates the need for a spring detent or the like to advise the transmission operator when kickdown is established. The arrangement disclosed provides a built-in hydraulic detent means for kickdown operation that positively advises the operator when he has depressed the accelerator to the wide open throttle position just prior to effecting of the kickdown operation.

I claim:

1. In a transmission control system, a combination kickdown and throttle pressure control valve comprising a casing having an axially extending valve receiving bore and a plurality of ports piercing the casing and connecting to axially spaced portions of said bore, a kickdown valve and a throttle pressure control valve mounted in spaced series arrangement within said valve bore and shiftable axially thereof independently and conjointly relative to each other, shift of said throttle valve axially of said bore across a line pressure fluid inlet between the ends of said bore providing a metered throttle pressure supply to a throttle pressure chamber intermediate the ends of said valve bore, a compressible resilient means arranged between and interconnecting said kickdown and throttle pressure control valves, a sleeve piston mounted in one end of said bore and arranged concentrically about said kickdown valve for axial movement both relative to the kickdown valve and conjointly therewith, and a valve operator arranged to engage and shift said kickdown valve independently of said piston for a predetermined movement after which further movement of the kickdown valve by said valve operator causes conjoint movement of said kickdown valve and said piston, the portion of said bore between said sleeve piston and said kickdown valve being connected by conduit means with a reaction chamber at the end of said bore adjacent said throttle valve and with the throttle pressure chamber of said valve bore to apply throttle pressure thereto, the throttle pressure applied to said piston opposing movement of the throttle valve towards said piston and cooperating with the throttle pressure in said reaction chamber to permit normal operation of said throttle valve with minimum effort due to the opposed forces applied thereto.

2. In a transmission control system, a combination kickdown and throttle pressure control valve comprising a casing having an axially extending valve receiving bore and a plurality of ports piercing the casing and connecting to axially spaced portions of said bore, a kickdown valve and a throttle pressure control valve mounted in spaced series arrangement within said valve bore and shiftable axially thereof independently and conjointly relative to each other, shift of said throttle valve axially of said bore across a line pressure fluid inlet between the ends of said bore providing a metered throttle pressure supply to a throttle pressure chamber intermediate the ends of said valve bore, a compressible resilient means arranged between and interconnecting said kickdown and throttle pressure control valves, a sleeve piston mounted in one end of said bore and arranged concentrically about said kickdown valve for axial movement both relative to the kickdown valve and conjointly therewith, and a valve operator arranged to engage and shift said kickdown valve independently of said piston for a predetermined movement after which further movement of the kickdown valve by said valve operator causes conjoint movement of said kickdown valve and said piston, the portion of said bore between said sleeve piston and said kickdown valve being connected by conduit means with a reaction chamber at the end of said bore adjacent said throttle valve and with the throttle pressure chamber of said valve bore to apply throttle pressure thereto, said kickdown valve cooperating with a bore port normally located between said valves and with said resilient means to control the throttle pressure force required to effect the kickdown operation, the throttle pressure applied to said piston opposing movement of the throttle valve towards said piston and cooperating with the throttle pressure in said reaction chamber to permit normal operation of said throttle valve with minimum effort due to the opposed forces applied thereto.

3. In a transmission control system, a combination kickdown and throttle pressure control valve comprising a casing having an axially extending valve receiving bore and a plurality of ports piercing the casing and connecting to axially spaced portions of said bore, a kickdown valve and a throttle pressure control valve mounted in series arrangement within said valve bore and shiftable axially thereof independently and conjointly relative to one another, a resilient means arranged between and interconnecting said kickdown and throttle pressure control valves, a compressible sleeve piston mounted in said bore and arranged concentrically about said kickdown valve for axial movement both relative to the kickdown valve and conjointly therewith, and a valve operator arranged to engage and shift said kickdown valve independently of said piston for a predetermined movement after which further movement of the kickdown valve by said valve operator causes conjoint movement of said kickdown valve and said piston, shift of said throttle valve axially of said bore across a line pressure fluid inlet between the ends of said bore providing a material throttle pressure supply to a throttle pressure chamber intermediate the ends of said valve bore, said casing having conduits to apply said throttle pressure fluid to a reaction chamber at one end of the throttle pressure control valve to cause movement thereof towards the other end of said casing, ports located so that movement of the throttle control valve axially of the bore will produce regulation of the throttle pressure fluid passing through the casing bore, a conduit applying throttle pressure fluid to said piston to urge said piston towards said casing other end and said kickdown valve in the opposite direction, and a port controlled by the movement of said kickdown valve within the valve bore to release the throttle pressure fluid applied to said piston to effect a kickdown operation, the throttle pressure applied to said piston opposing movement of the throttle valve towards said piston and cooperating with the throttle pressure in said reaction chamber to permit normal operation of said throttle valve with minimum effort due to the opposed forces applied thereto.

References Cited in the file of this patent

UNITED STATES PATENTS

| | | |
|---|---|---|
| 2,733,732 | Baker | Feb. 7, 1956 |
| 2,792,716 | Christenson | May 21, 1957 |
| 2,851,906 | De Lorean | Sept. 16, 1958 |
| 2,919,597 | Borman | Jan. 5, 1960 |
| 2,926,543 | Holdeman et al. | Mar. 1, 1960 |
| 3,048,055 | Borman et al. | Aug. 7, 1962 |